Figure 1:
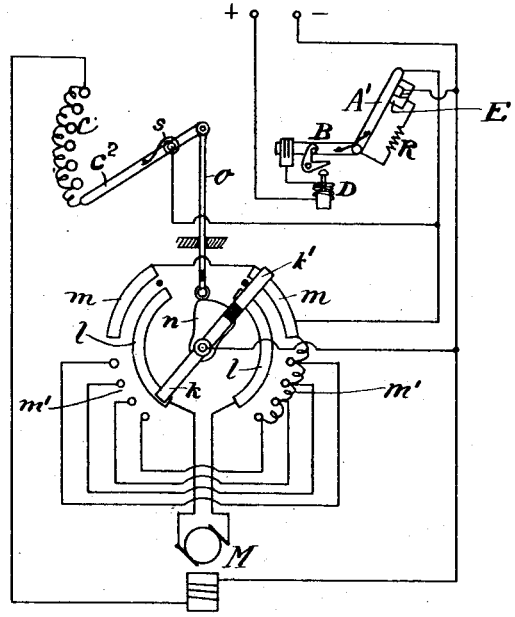

H. W. LEONARD.
CONTROLLER FOR ELECTRIC MOTORS AND SIMILAR DEVICES.
APPLICATION FILED JULY 15, 1912.

1,077,615.

Patented Nov. 4, 1913.

Witnesses
E. Nicol
C. Galvion

H. Ward Leonard Inventor
By his Attorneys
Edwards, Sager & Wooster

UNITED STATES PATENT OFFICE.

HARRY WARD LEONARD, OF BRONXVILLE, NEW YORK.

CONTROLLER FOR ELECTRIC MOTORS AND SIMILAR DEVICES.

1,077,615.   Specification of Letters Patent.   Patented Nov. 4, 1913.

Original application filed July 11, 1903, Serial No. 165,061. Divided and application filed May 17, 1907, Serial No. 374,130. Divided and this application filed July 15, 1912. Serial No. 709,432.

*To all whom it may concern:*

Be it known that I, HARRY WARD LEONARD, a citizen of the United States, residing at Bronxville, in the county of Westchester and State of New York, have invented certain new and useful Improvements in Controllers for Electric Motors and Similar Devices, of which the following is a full, clear, and exact specification.

This application is a division of my pending application for improvement in controllers for electric motors, and similar devices, filed May 17, 1907, Serial Number 374,130, renewed July 18, 1910, Serial Number 572,581, being a division of my original application, filed July 11, 1903, Serial Number 165,061, on which Letters Patent Number 855,897, was granted June 4, 1907.

My invention relates principally to the devices employed for starting and regulating the speed of electric motors, and to the devices employed for protecting such devices and the motor against damage due to abnormal variations in the circuit. Heretofore such devices, and particularly the starters and field controllers, were preferably entirely separate pieces of apparatus and were operated independently of each other. Such arrangement of the controlling devices are frequently the cause of injury to the motor and controlling means due to the improper operation of the separate devices and to carelessness or ignorance on the part of the operator.

One object of my invention is to combine a motor starter, speed regulator and automatic protective devices with means, whereby the several elements constituting a controller can only be operated in the proper sequence to start and regulate a motor, and so that the protective devices will always be in a position to respond to abnormal changes in the motor circuit, and whereby the starting of a motor and the control of its speed will be "fool proof"; that is to say, the controlling apparatus and the motor will be entirely safe, even in the hands of inexperienced, careless or ignorant operators.

In the operation of many kinds of machine tools and other appliances by electric motors, it is very desirable that there be provided a simple, efficient, reliable, inexpensive and compact form of controlling apparatus by means of which the motor can be started and brought to full speed, and later, if necessary, operated at any speed over as wide a range of speed as possible. On account of the efficiency and simplicity of the method, it is very desirable to secure the speed variation by varying the field strength of the motor. Electric motors have now been so far improved as regards freedom from sparking, that they require very little attention in operation, even when the field is varied over a very wide range, and hence in the future these motors will be very extensively employed in the operation of machine tools and in performing many other kinds of work where a wide range of speed is of value, and especially where the torque varies inversely as the speed to such an extent that the power of the motor is more or less constant. The controlling apparatus for such motors should have the following characteristics:—First, an overload protective device which will positively and with sufficient promptness open the circuit to the motor if under any conditions of starting or operation a current greater than a certain predetermined amount should flow in the motor circuit. Second, this overload device must be such that the motor can be safely and simply started up again by the operator without loss of time and without expense. Third, a "no-voltage release" or electro-responsive device which will automatically act if the supply voltage fails, or is reduced to a very low point, to protect the motor against the risks due to a sudden rise to full voltage, and such "no-voltage" device shall be dependent upon the volts upon the motor armature and shall be independent of any current through the motor. Fourth, a device by the manipulation of which the operator can readily change the speed of the motor gradually and over a wide range, so that, for example, a cutting tool can be worked in the most efficient manner at any speed and cut within the capacity of the motor. Fifth, a starting rheostat. Sixth, interlocking or functionally related mechanism, or equivalent arrangement of mechanism, which will insure the proper sequence of adjustments, and whereby it will be impossible for the operator to start the motor while the motor has an improperly weakened field. While this interlocking or equivalent mechanism is preferably arranged directly between the speed controlling device and the motor starter, it is evident that it may be applied between any device controlling the speed controller and any device which controls the current passing through the motor armature, such as a switch in series with the motor armature and starter.

My invention is illustrated in the accompanying drawings, in which—

Figure 2:
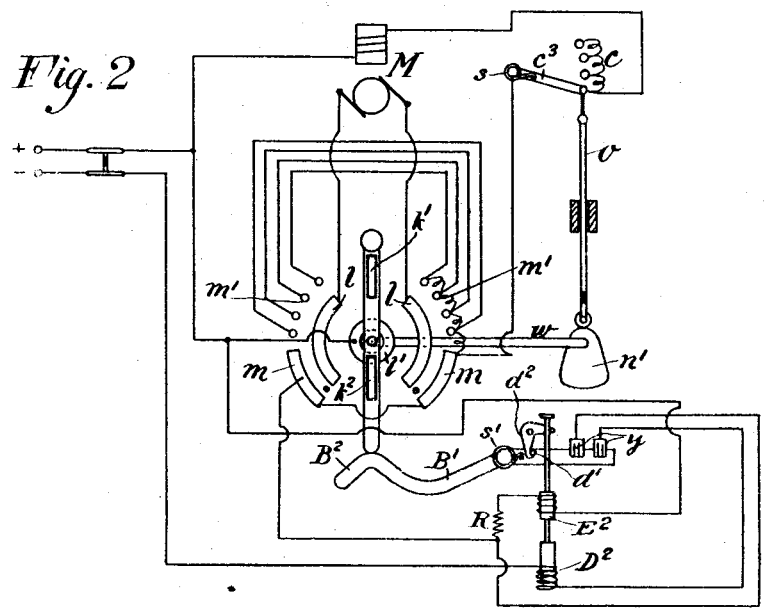

Figure 1 is a diagram illustrating one form of my invention, and Fig. 2 is a diagram of a modified form of my invention.

In Fig. 1 my invention is shown applied to a reversing controller and in which the reversing controller and field rheostat are functionally related so that the resistance of the controller cannot be cut out except when the field is in a certain condition. The armature and field winding of the motor is indicated at M. In the main circuit is a switch comprising the two spring pressed arms A′, B, the current passing from one supply terminal through the overload solenoid D, which may act to release arm B and open the circuit, then through arms B and A′ through the reversing controller and motor armature to the other supply terminal. Current also passes independently from one side of the line through the resistance R and retaining magnet E to the other side, and there is likewise a circuit across the line including the field of the motor, the field resistance $c$ and the field rheostat arm $c^2$.

The movable element of the reversing controller comprises an arm $k$ electrically connected to one side of the line and engaging one or the other of two contact segments $l$ connected to the terminals of the motor armature. The movable element also includes an insulated conducting portion $k'$ which electrically connects the contact segments $l$ with the concentric outer strips $m$ and the contacts $m'$ of the controlling resistance. The operating shaft of the controller carries a cam $n$ on which rides one end of a rod $o$ connected to the field rheostat arm $c^2$, a spring $s$ on arm $c^2$ tending to force the rod against the cam. The position of the arm $c^2$ is consequently determined by the position of the reversing controller. The off position of the controller arm is a vertical one with the part $k'$ downward. Suppose the circuit breaker to be closed and that the controller arm is turned from the off position so that the part $k'$ engages the contacts at the right. The current will then pass from say positive line to right-hand segment $m$, through the armature resistance to part $k'$, segment $l$, motor armature, left-hand segment $l$, arm $k$ to negative line. As the arm is rotated left-handedly, the armature resistance will be gradually cut out and will be all cut out when $k'$ engages segment $m$. During this operation, the rod $o$ has remained at its lowest position by pressure of spring $s$ and all field resistance has therefore been cut out giving a strong field. Upon further movement of the controller, the rod $o$ rides upon an inclined portion of cam $n$, causing field resistance to be gradually cut in giving a further increase in the speed of the motor. This condition is illustrated in the figure. If now it is desired to reverse the motor, the controller arm will be turned in a right-hand direction, which first cuts out the field resistance, then cuts in the armature resistance and then breaks the armature circuit. Continuing the movement brings the part $k'$ in contact with the left-hand contacts and part $k$ in contact with the right hand segment $l$. Current then passes through the armature resistance and armature in the opposite direction giving reversal in rotation. Further movement of the controller arm cuts out the armature resistance while the field is maintained at full strength and afterward weakens the field as previously explained.

In Fig. 2 I have shown an interlocked or functionally related reversing controller, field rheostat and circuit breaker. The circuit breaker is shown in the form of a pivoted switch B′, spring pressed by spring $s'$ at its pivot so as to tend to move the switch to open the main circuit at contacts $y$. A pivoted latch $d^2$ tends normally to engage the pin $d'$ when the switch is in the closed position and to hold the same closed. A plunger for tripping the latch is shown as having two iron cores. One is acted upon by the coil $E^2$ which forms a circuit across the line in series with a resistance R through switch B′ and contacts $y$ and normally tends to hold the plunger up and which, upon occurrence of no-voltage, permits the plunger to fall and trip the latch $d^2$ and allows the circuit breaker to be opened by spring $s'$. The other core is acted upon by coil $D^2$ in series in the main circuit and which upon the occurrence of overload is adapted to draw the plunger down to trip latch $d^2$ and open the circuit.

The reversing controller is provided with the contact segments $l$, $l$, the contact segments $m$, and the resistance contacts $m'$. The controller arm is provided with an insulated conductor $k^2$ adapted to engage segments $l$ and the plate $l'$ and also provided with an insulated conductor $k'$ adapted to connect the segments $l$ with the segments $m$ or resistance contacts $m'$. The controller arm in the position shown, which is the off position, engages an extension $B^2$ of switch B′ so as to close the latter. The plate $l'$ is connected to one supply line and the segments $m$ are connected to the other supply line through switch B′ and contacts $y$. The segments $l$ are connected to the armature terminals. The motor field coil is shown connected across the line in series with a variable resistance $c$ and arm $c^3$. The arm $c^3$ is pressed by a spring $s$ tending to return it to such a position that no field resistance is included and also tending to press the rod $o$ which is attached to arm $c^3$, against a cam $n'$. The cam $n'$ is attached to shaft $w$ which is also the shaft of the controller arm. The shape of cam $n'$ is such that in the off position of the controller, rod $o$ is in its lowest position and all field resistance out of circuit.

When the controller arm is moved in one direction the armature circuit will be closed through the starting resistance and when the circuit is first closed the switch B' will be free to open automatically upon occurrence of overload or no-voltage since the controller arm will not then engage the projection B². As the controller arm is moved, the armature resistance will be gradually cut out and will be entirely cut out when $k'$ makes contact with one of the segments $m$. Up to this position the shape of cam $n'$ is such that rod $o$ remains in its lowest position, but upon further movement of the controller arm, the rod $o$ will be raised and resistance cut in the field circuit. When the controller arm is moved in the opposite direction, a similar action will take place except that the current through the motor armature will be reversed. It is therefore apparent that if the circuit breaker opens, it can be closed and the motor started again only by first returning the controller arm to off position and when the arm is returned to off position, all field resistance will be cut out.

Although I have shown specific forms of my invention herein, my invention may be embodied in various other forms of construction, and it will be understood that my invention is not limited to the precise forms herein shown and described. My invention is also capable of use with currents of different forms and with various types of motors, such as motors of direct or alternating current type.

Having thus described my invention, I declare that what I claim as new and desire to secure by Letters Patent, is,—

1. A controlling device for an electric motor comprising an armature controlling movable element, a field resistance controlling movable element, said elements being independently movable, and a single operating handle for moving both of said elements and for causing resistance to be inserted in the field circuit.

2. A motor having a field winding energized independently of its armature current, a circuit controlling movable element for controlling the armature and the field circuit, a second circuit controlling movable element for controlling resistance in the field circuit and movable independently of said first named element, and a single operating device for moving said movable elements and for causing resistance to be inserted in the field circuit.

3. A shunt wound motor, a movable switch element for making and breaking the armature and field circuits of said motor, a movable element for gradually and controllably weakening the motor field strength, and a common means for moving said elements and for causing the movement of said second element to weaken the motor field to any desired degree.

4. An electric motor having a shunt field winding, two movable motor controlling elements, one of said elements being the movable element of a motor field rheostat, a common operating member for said elements and for accelerating the motor by movement of said last named element, a no-voltage winding, and an automatic switch, the said switch controlling the three circuits in which are connected the motor armature, the motor field winding and the no-voltage winding.

5. An electric motor, and controlling apparatus, said controlling apparatus comprising a no-voltage controlling magnet, and a movable member for starting the motor and weakening its field strength and for rendering effective the no-voltage magnet.

6. In a motor controlling apparatus, starting and speed regulating mechanism, a no-voltage controlling magnet, and an operating handle for starting the motor, regulating its speed and for rendering the no-voltage magnet effective.

7. In a manually operable motor controller, an armature resistance, a field resistance, and means comprising a movable circuit controlling element for causing by its manual movement the armature resistance to be gradually cut out and thereafter the field resistance to be gradually inserted, and no voltage protective means comprising a no voltage winding connected in parallel with the motor windings.

8. An automatic circuit breaker element, a motor armature controlling movable element, a motor field controlling movable element, said three elements being protectively related so as to be operable only in definite sequence during the acceleration of the motor, and a common operating means therefor.

9. The combination of a motor armature, a field winding, an armature resistance, a field resistance, a local circuit connecting the motor armature, armature resistance, field winding and field resistance in series with each other, means comprising a movable element the movement of which element causes said local circuit to be connected to the supply line, to then cause the armature resistance to be cut out, to then cause the field resistance to be inserted, and protective means comprising a protectively functionally related no voltage winding.

10. An electric motor, an armature resistance, a field resistance, the motor armature winding, said armature resistance, a field winding of the motor and said field resistance being adapted to be connected in a closed circuit, a circuit breaker for connecting the said closed circuit with the supply circuit, two movable elements for varying the armature and field resistances respectively, and a single operating device for moving said elements for starting and accelerating the motor.

11. The combination with a motor having an armature and a field winding, of manually movable motor controlling mechanism comprising an armature resistance, a field resistance, a single element for causing said armature and field resistances to be varied respectively and successively in definite sequence, means for connecting the armature in a closed local circuit, and means automatically responsive to abnormal circuit conditions for causing the opening of the entire motor circuit while leaving the motor armature connected to said closed local circuit.

12. The combination with a motor of reversing and speed controlling means, comprising a single movable element by the movement of which under control of the operator the current through the motor armature may be reversed, then the voltage across the motor armature gradually increased and then the effective strength of the field of the motor gradually reduced, and automatic protective no voltage means therefor.

13. A controlling device for electric motors comprising a pair of resistances, each provided with its respective resistance varying movable member, and means in connection with one of said members and inoperative until the member reaches a predetermined position for moving the second member to gradually and successively insert any desired portions of its resistance in circuit.

14. A controlling device for electric motors comprising a starting and a field resistance provided with manually movable controlling members, means for rendering the field member operative only after the starting member has reached running position, and functionally related automatic protective means.

15. A controlling device for electric motors comprising a pair of gradually variable resistances, each provided with an independent controlling member, and means controlled by one of said members and inoperative until the member reaches a predetermined position for moving the second member to gradually and successively insert any desired portions of its resistance in circuit.

16. A controlling device for electric motors comprising a starting resistance and a field resistance, each provided with an independent controlling arm, and means movable with the starting arm and inoperative until the arm reaches its running position for moving the field arm to vary its resistance.

17. The combination with an electric motor, of means for varying and reversing the armature current, means for varying the field current, an automatic switch in series with the motor armature, and a single movable element for operating said means and for closing said switch.

18. An electric motor, resistances for varying the armature and field currents in the motor, an automatic switch, a no-voltage device for controlling the automatic movement of said switch, and a movable element for controlling said resistances and for closing said switch.

19. An electric motor, resistances for varying the armature and field currents in the motor, an automatic switch, an overload device for controlling the automatic movement of said switch, and a movable element for controlling said resistances and for closing said switch.

20. An electric motor, resistances for varying the armature and field currents in the motor, an automatic switch, no-voltage and overload devices for controlling the automatic movement of said switch, and a movable element for controlling said resistances and for closing said switch.

21. An electric motor having a field winding energized independently of its armature current, a reversing armature switch, an automatic circuit breaker in series with the armature of the motor, and means for causing said switch by its movement to close said circuit breaker and vary the current in said field winding.

22. An electric motor, a reversing switch, an automatic protective switch in series with the motor armature responsive to no-voltage, and means whereby the movement of said reversing switch effects the closure of said automatic switch.

23. An electric motor having a field winding, a reversing switch, an automatic protective switch in series with the motor armature responsive to overload current, and means whereby the movement of said reversing switch effects the closure of said automatic switch and varies the current in said field winding for controlling the speed of the motor.

24. An electric motor, a reversing switch, an automatic protective switch in series with the motor armature responsive to no-voltage and overload, and means whereby the movement of said reversing switch effects the closure of said automatic switch.

25. An electric motor, an automatic switch automatically responsive to no-voltage and overload in series with the motor armature, means for varying the resistance of the motor armature circuit and for varying the motor field strength, and an element controlling said means and also effecting the closure of said automatic switch.

26. In motor controlling apparatus the combination of three functionally related movable elements, one of said elements being an automatic circuit breaker, one being a motor armature resistance controlling element and one being a motor field resistance controlling element, and a single means for moving all of said elements in definite sequence during the starting of the motor.

27. A controlling device for an electric motor comprising starting and speed regulating mechanism, a no-voltage magnet, and a common operating means arranged to start the motor, regulate its speed, and bring the starting mechanism under the influence of the no-voltage magnet.

28. In a motor controlling mechanism, a motor armature resistance, a motor field resistance, means comprising a single operating handle for causing, by its movement the armature resistance to be cut out and then causing the field resistance to be cut in circuit, a functionally related automatically movable circuit controlling element for automatically opening the entire motor circuit, and means for insuring the closure of said element only when the controlling mechanism is in a protective position.

In testimony whereof I affix my signature in presence of two witnesses.

HARRY WARD LEONARD.

Witnesses:
LEONARD KEBLER,
JAMES W. GOOD.

Copies of this patent may be obtained for five cents each, by addressing the "Commissioner of Patents, Washington, D. C."